(12) United States Patent
Luzzatti et al.

(10) Patent No.: US 7,836,184 B2
(45) Date of Patent: Nov. 16, 2010

(54) METHOD FOR MANAGING THE ALLOCATION OF RESOURCES TO CHANNEL SWARMS IN A PEER-TO-PEER NETWORK

(75) Inventors: Omer Luzzatti, Tel-Aviv (IL); Lev Korostyshevsky, Jerusalem (IL); Haggai Scolnicov, Tel-Aviv (IL)

(73) Assignee: Ray-V Technologies, Ltd., Tel-Aviv (IL)

( * ) Notice: Subject to any disclaimer, the term of this patent is extended or adjusted under 35 U.S.C. 154(b) by 231 days.

(21) Appl. No.: 12/120,652

(22) Filed: May 15, 2008

(65) Prior Publication Data
US 2009/0287821 A1   Nov. 19, 2009

(51) Int. Cl.
*G06F 15/173* (2006.01)
(52) U.S. Cl. .................. 709/226; 709/229; 725/109
(58) Field of Classification Search .................. 709/226
See application file for complete search history.

(56) References Cited

U.S. PATENT DOCUMENTS

| | | |
|---|---|---|
| 7,174,385 B2 | 2/2007 | Li |
| 2002/0161898 A1 | 10/2002 | Hartop et al. |
| 2004/0236863 A1 | 11/2004 | Shen et al. |
| 2006/0224687 A1 | 10/2006 | Popkin et al. |
| 2006/0242315 A1 | 10/2006 | Nichols |
| 2007/0233866 A1* | 10/2007 | Appleby et al. ............. 709/226 |

FOREIGN PATENT DOCUMENTS

| | | | |
|---|---|---|---|
| WO | PCT/IL2007/000392 | | 10/2007 |
| WO | WO2008012488 | * | 1/2008 |

OTHER PUBLICATIONS

Bawa et al. Transience of Peers and Streaming Media. Jan. 2003. ACM SIGCOMM Computer Communications Review.*
Hefeeda, et al. "Peer-to-Peer Media Streaming Using CollectCast", 2003 Proc. of ACM Multimedia 2003 pp. 45-54.
Zhang, et al. A Data Driver Overlay Network for Efficient Live Media Streaming, 2004.

* cited by examiner

*Primary Examiner*—Vivek Srivastava
*Assistant Examiner*—Bryan Lee
(74) *Attorney, Agent, or Firm*—Myers Wolin LLC

(57) ABSTRACT

A method for managing the allocation of resources to channel swarms in a peer-to-peer (P2P) network. The method is based on a distributed algorithm in which resource-nodes occasionally join and leave channel-swarms. Each resource-node independently decides whether or not to stay in the channel-swarm that it has joined to. These decisions are based on values of a transience parameter set by a transience mechanism.

24 Claims, 3 Drawing Sheets

US 7,836,184 B2

METHOD FOR MANAGING THE ALLOCATION OF RESOURCES TO CHANNEL SWARMS IN A PEER-TO-PEER NETWORK

TECHNICAL FIELD OF THE INVENTION

The present invention relates generally to the field of network communication and media distribution. More specifically, it relates to a system and method for improving real time data distribution in a peer-to-peer (P2P) network.

BACKGROUND OF THE INVENTION

The ubiquity of the Internet enables the adoption of new techniques to enable direct distribution of multimedia files and real-time media streaming to end-users in an electronic format. The advantages associated with electronic distribution allow media content providers to establish global distribution systems for digital content. Furthermore, new compression algorithms, designed specifically for multimedia data, dramatically reduce the bandwidth and storage space required for electronic distribution of multimedia data. This, together with the availability of broadband communication, encourages content providers to adopt the Internet as an alternative distribution system complementing the conventional distribution systems (e.g., cable or satellite TV).

Peer-to-peer (P2P) or grid networks enable the distribution of media between users without using server-centric solutions. For example, P2P file sharing systems are well known in the industry and use an efficient technology to deliver media. Examples for such P2P systems are BitTorrent® and Gnutella. However, these systems do not distribute the content in real-time. Rather, a user can download the content (files) and consume it only when the download has completed, i.e., a user cannot consume the content while downloading it.

Recently, new systems for real-time streaming over P2P networks have been developed. Examples for such systems may be found in "A Data Driver Overlay Network for Efficient Live Media Streaming" by Zhang, et al. and in "P2P Media Streaming", by Hefeeda, et al., both of which are incorporated herein by reference, merely for the useful understanding of the background of the invention. Real-time streaming systems fail to fully utilize the network's resources, as they do not consider the asymmetric nature of the nodes (peers) in a typical Internet Protocol (IP) network. Generally, such systems consider the upload bandwidth of nodes equal to the download bandwidth. This is rarely the case in IP networks, such as asymmetric digital subscriber line (ADSL) and cable-based networks, as in most cases a node's upload bandwidth is half or less of the bandwidth of the download. Another type of real-time P2P network for distributing media can be found in PCT application number PCT/IL2007/000392 entitled "Realtime Media Distribution in a P2P Network," by Omer Luzzatti, et al. (hereinafter "Luzzatti") which is assigned to common assignee. Luzzatti discloses a real-time P2P network where nodes in the network can act in the role of 'amplifiers', increasing the total available bandwidth in the network and thus improving the quality of the media consumed by the viewers.

Real-time media distribution via P2P networks presents the challenge of optimal allocation of resources to channel-swarms. In order to ensure sufficient (potential) media quality in all swarms, enough individual resources must be assigned to each swarm, but only as little as is required to support the swarms. This challenge is further exacerbated as the numbers of both channel-swarms and consumers grow. The possibility of frequent and sharp changes in the composition of swarms (for example, viewership of TV-like media channels) calls for a highly scalable and responsive solution.

One possible strategy to address this challenge is to use a centralized computing process executed by a network server. The process would determine which resources should be allocated to each channel swarm at any given moment. Such a process would receive information regarding available resources and demands of channels and viewers and determine the best assignment of resources to channel swarms. However, concerns of both scalability and responsiveness associated with supporting large numbers of consumers and channel-swarms in flux, which are discussed in greater detail above, render this strategy unfeasible.

DETAILED DESCRIPTION OF THE INVENTION

In the view of the foregoing, it is an object of the present invention to provide a method for managing the allocation of resources to channel-swarms in a peer-to-peer (P2P) network. The method is based on a distributed algorithm in which resource-nodes occasionally join and leave channel-swarms. Each resource-node independently decides whether or not to stay in a channel-swarm it joins. These decisions are based on values of a Transience Parameter set by a Transience Mechanism.

Figure 1:
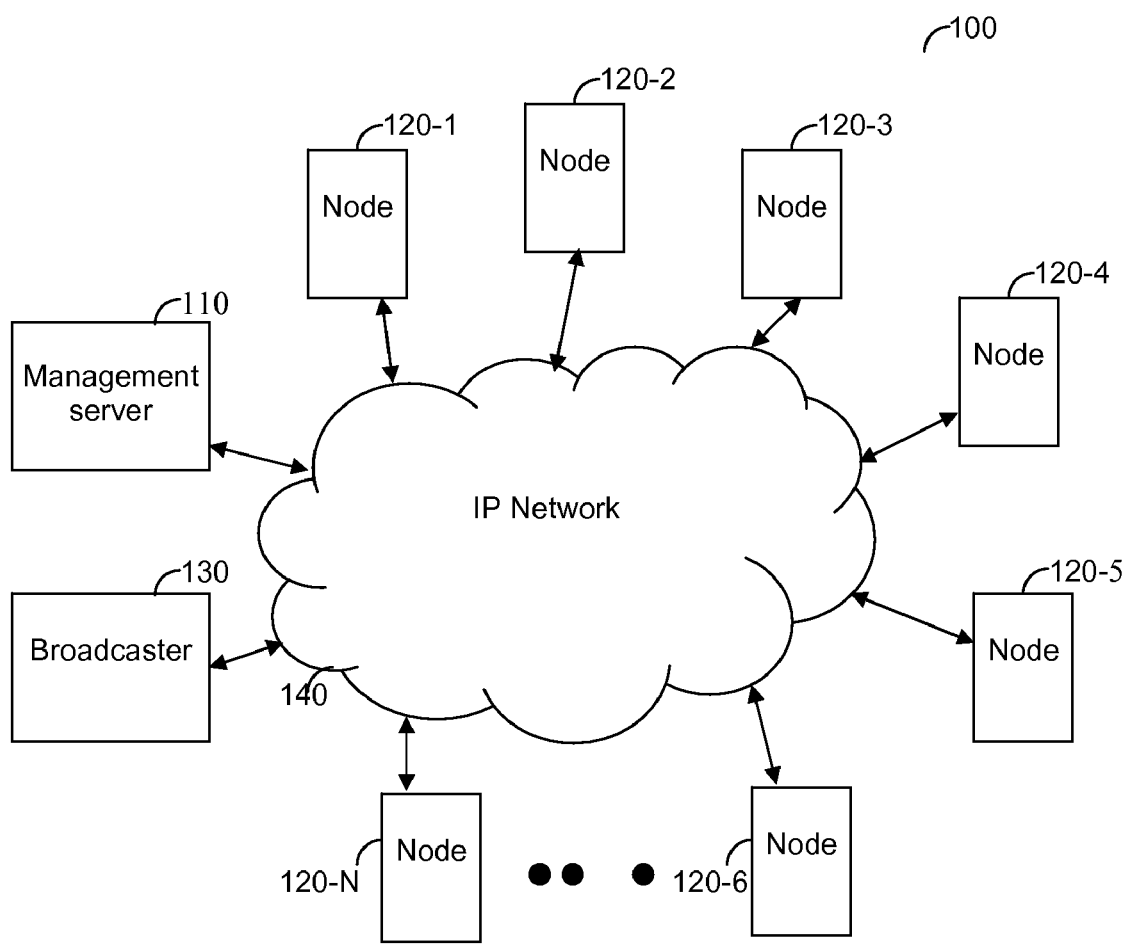
FIG. 1 is an exemplary diagram of a P2P network used to describe certain the principles of the present invention.

FIG. 1 shows a non-limiting and exemplary diagram of a P2P network 100 used to describe the principles of the invention. The P2P network 100 includes a plurality of nodes (peers) 120, and a broadcaster 130, all of which communicate with each other over an Internet protocol (IP) network 140. The P2P network 100 may further include a centralized management server 110.

The P2P network 100 is utilized to distribute content in several parallel (and alternative) "channels". For example, the P2P network 100 may distribute several unrelated channels (e.g., TV-like channels) of real-time streaming media, with viewers who can choose to view one particular stream at a time. The nodes 120 distributing the content of a particular channel constitute a "channel swarm".

The nodes 120 may be, but are not limited to, personal computers, servers, portable media devices, media control devices, set-up boxes, or any other device capable of exchanging data with other nodes connected to it. A node may also refer to a module of a software system such as a media player application. Each node 120 can act as a consumer-node and/or a resource-node.

A consumer-node is a node 120 that belongs to an end-user who wants to watch a channel (i.e., to consume the real-time content). Each consumer-node is constrained to join one or more channel-swarms as determined by the end-user, and must receive consumable streams of the real-time content. An end-user can view media content broadcast in a channel on a display connected to the consumer-node. This includes, but is not limited to, a TV screen connected to a set-up box or a monitor connected to a personal computer.

A resource-node is a node 120 with an available upload bandwidth that can be contributed to the one or more channel-swarms. In accordance with one embodiment, a resource-node may be a dedicated network device that shares its bandwidth, but does not consume the media. Such devices are typically installed by service providers. A resource-node may be also an amplifier, as described in greater detail in Luzzatti, the description of which is hereby incorporated by reference. It should be noted that different resource-nodes may have different capabilities, and in particular may be differently capable of providing resources to different consumer-nodes. The allocation of particular resource-nodes to a channel should be chosen to guarantee a certain quality of service, while minimizing the overhead associated with joining a channel swarm.

In accordance with an embodiment of the present invention, nodes 120 communicate with each and other and with the management server 110 using, for example, a computer program executed over the nodes. The management server 110 is a distributed, scalable, hardware independent system that executes tasks associated with the management of real-time distribution of media content over the P2P network 100. The management server 110 typically provides lists of channels and of peers (such as resource-nodes or consumer-nodes) in channel-swarms to nodes 120. For example, such information may include a list of channels that a node 120 may join based on information collected from the network or predicated behavior of channels.

Figure 2:
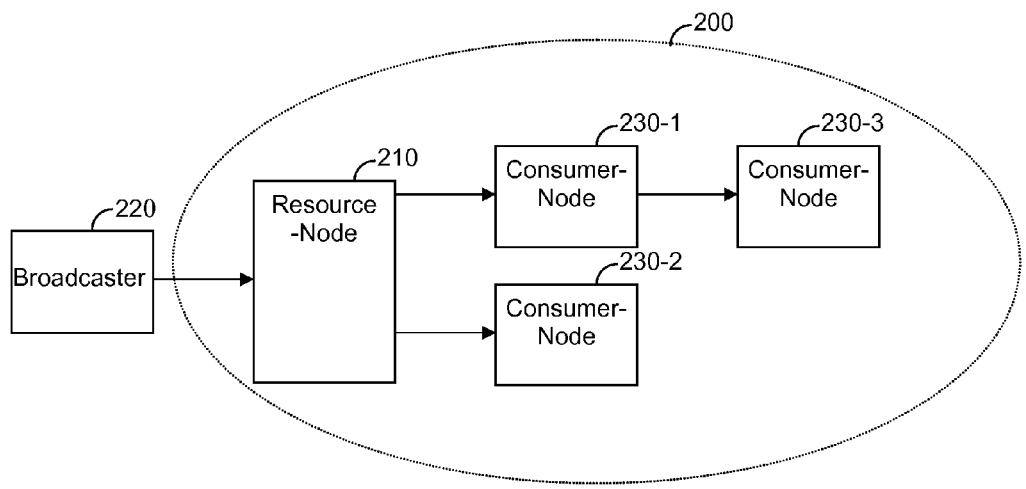
FIG. 2 is an exemplary diagram of a channel swarm in a P2P network.

The IP network 140 may be any type of synchronous or asynchronous packet-based network, including wireless networks that are capable of carrying data information. The broadcaster 130 originates the live stream that, along with a set of resource-nodes 120, participates in the transmission of a TV-like channel media or other type of media to create a channel-swarm. A channel swarm also includes a set of consumer-nodes that consume the media. It should be noted that a resource node and/or a consumer-node may be parts of multiple channel-swarms. As illustrated in FIG. 2, when a resource-node 210 joins a channel-swarm 200 it transmits, in real-time, media from a broadcaster 220 to consumer-nodes 230 that consume the media.

In accordance with an embodiment, the management of resource allocation is based on resource-nodes that occasionally join and leave channels solely on their estimate of how well they serve the swarms. Specifically, a resource-node occasionally joins a new channel swarm, determines, during a first Transient Period, whether its resources are required by consumer-nodes in the swarm, and if so the resource-node remains in the channel swarm. This decision is based on a transience mechanism described in detail below. In addition, a resource-node occasionally determines, during a second Transient Period, whether the consumer-nodes of the channel swarm may achieve sufficient resources without its presence in the swarm. If so, the resource-node leaves the channel. This decision is also based on the transience mechanism. This allocation management process ensures that a resource-node remains connected mostly to channels in which its resources are required by consumer-nodes and stays connected for the duration of the first-transient-period and the second-transient-period (and more if needed) in channels in which its resources are not required. The "occasional" decision to join or leave a channel is preferably achieved using a random binary decision at fixed intervals of time.

The transience mechanism uses a P2P protocol between resource-nodes and consume-nodes to control the lifetime of resource-nodes in each channel-swarm the allocation of resource-nodes to channels. Resource-nodes set a transience value of a transience parameter for every channel swarm they are connected to, and communicate the transience values to all consumer-nodes in the swarm. For example, resource-node 210 transmits its transience value to consumer-nodes 230-1, 230-2 and 230-3.

The transience parameter determines, to some extent, the likelihood that a resource-node will remain connected to a swarm it joins. For example, a high value of the transience parameter indicates that a resource-node has a high probability to leave the swarm, while a low value indicates the opposite. A resource-node changes the value of its transience parameter as a function of the time passed since joining the channel-swarm. Of course, the value can be defined in any manner in which the probability of staying connected or leaving a swarm is communicated among the nodes of the swarm.

Consumer nodes receive the transience values sent from one or more resource-nodes and usually consume data from resource-nodes with the lowest transience value. However, additional criteria may be employed by each consumer-node to determine which resource-nodes to use. One such criterion could be the throughput from the resource-node to the consumer-node that may be required to exceed some pre-configured threshold. Another possible criterion is resource-node reliability. A consumer-node may prefer a reliable resource-node even if its transience value is not the lowest.

A resource-node leaves a channel-swarm if one or more consumer-nodes in the channel-swarm do not utilize the resources (i.e., bandwidth) provided by the resource-node. The utilization level is predefined and periodically measured. This ensures that resource-nodes serve only channel-swarms that actually require their bandwidth.

Figure 3:
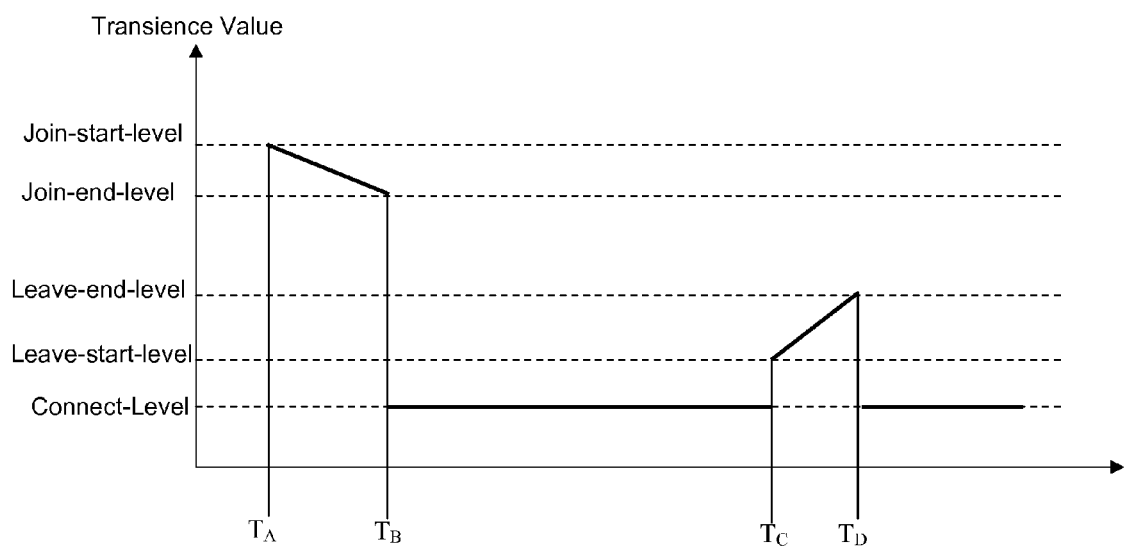
FIG. 3 is an exemplary graph illustrating the behavior of the transience parameter.

A graph illustrating the behavior of the transience parameter of a resource-node is provided in FIG. 3. The value of the transience parameter may be set to one of a number of pre-defined levels. The first level is set when the resource-node, at time $T_A$, joins the swarm. This level is hereby designated as "join-start-level"; it has relatively high transience value. This embodies that when a resource-node has just joined a channel swarm, the resource-node should be utilized only by consumer-nodes with no other alternatives. The value gradually decreases from the join-start-level to a "join-end-level", thereby indicating to consumer-nodes that the resource-node should be utilized in preference to more-recently joined resource-nodes, but other resource-nodes having lower transience value should be chosen first. The time elapsed between $T_A$ and $T_B$ (i.e., join-start-level and join-end-level) is the first transient period in which the resource node decides whether or not to join a channel.

At a time $T_B$, when the first transient period is over and the resource-node joins the channel swarm, the transience parameter is set to a "connect-level" having the lowest transience value. Occasionally, e.g., at time $T_C$, the resource-node attempts to leave the swarm by raising the transience value to a "leave-start-level", and then until time $T_D$, gradually increasing its transience to a "leave-end-level". The time elapsed between $T_C$ and $T_D$ (i.e., leave-start-level and leave-end-level) is the second transient period in which the resource node decides whether or not to leave the channel. The transience value of the leave-start-level is higher than the value of the connect-level and the value of the leave-end-level is lower than the value of the join-end-level. A resource-node randomly times its transit to the leave-start-level and leave-end-level, unless the management server 110 directs the node to stay with the swarm.

It should be noted that the values of the different levels may be somewhat different for each resource-node. For example, two resource-nodes may have slightly different connect-level transience values, both significantly lower than leave-end-level. This ensures that all consumer-nodes will almost always uniformly prefer resource-nodes in some strict order, without changing any of the previous considerations. In some cases, e.g., when an excess of several resource-nodes of similar capabilities serve a channel-swarm, this accelerates the process of reducing the number of resource-nodes in the channel and freeing up redundant resources, as consumer-nodes gravitate rapidly towards the resource-nodes with slightly lower connection-levels.

Figure 4:
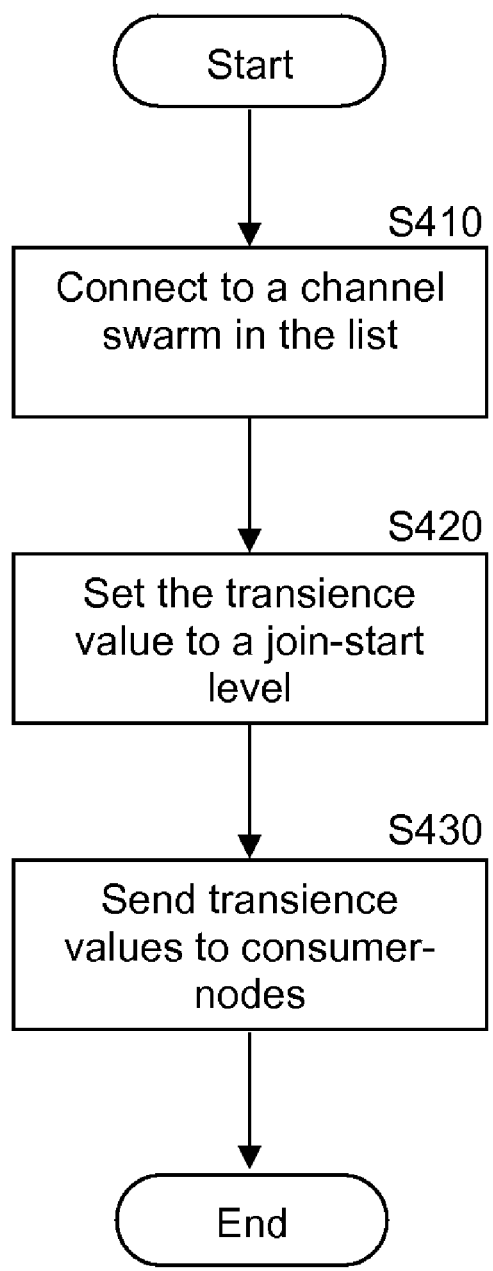
FIG. 4 is an exemplary flowchart describing the method of managing channel-swarms in accordance with an embodiment of the present invention.

FIG. 4 shows a non-limiting and exemplary flowchart 400 describing the method for allocating resources to channel swarms, as implemented by resource-nodes, in accordance with an embodiment of the invention. At S410 each resource-node in the P2P network occasionally tries to connect to one of the channel-swarms in the P2P network. At S420 each resource-node that is connected to a swarm sets its transience parameter value to a join-start-level, thereby indicating to consumer-nodes in the swarm as to whether the resource-node stays or leaves the swarm. The transience parameter value is set to the different levels and changes over time as discussed in greater detail above. At S430 resource-nodes periodically send transience parameter values to consumer-nodes. A consumer-node connects to a resource-node that has the lowest transience parameter value, if that node can provide in real-time high quality streamed media. The quality of the streamed media is determined according to a plurality of thresholds preconfigured at the consumer-nodes. This usually allows consumer-nodes to disconnect from a resource-node that has a transience parameter value that is no longer the lowest value. As a result, once that resource-node no longer needs to transmit data to consumer-nodes, resource-node can leave this particular channel-swarm and may join another swarm in the P2P network.

It would be apparent to a person skilled in the art that the transience parameter defines a mechanism to leave a swarm if a resource-node does not provide optimal performance to consumer-nodes in the swarm. Having left a swarm the resource-node may join another swarm and check if consumer-nodes can be served better there. As resource-nodes may be part of multiple different channels, a resource-node can leave and join different channels at the same time. Furthermore, the process described herein determines over time the best configuration of channel swarms, i.e. the best assignment of resource-nodes to channel swarms that allows broadcasting the media content at high quality and in real-time.

In accordance with one embodiment of the present invention resource-nodes may occasionally connect to one or more channel swarms designated in a list generated by a management server. Specifically, the management server (e.g., server 110) creates a channel list for each resource-node in the P2P network. Channels included in the list are determined using, for example, a weighted lottery algorithm. For each channel, the weight for this algorithm may be static and pre-configured, based on a variety of considerations, such as quality of service or expected demand for the resources in that particular channel.

In another embodiment, the weights of the weighted lottery algorithm may be dynamically changed. This allows reacting faster to sharp changes in the distribution of consumer-nodes and of their requirements between channels. The dynamic weights may be set according to a plurality of channel events gathered from the P2P network. The channel events are typically based on the status of the channel or on constant parameters. As a non-limiting example, the channel events may be, but are not limited to, insufficient resources, poor streaming quality, scheduled load (e.g., beginning of a new program on a TV-like channel, prime-time), or a user-defined event.

In an embodiment of the present invention, some or all of the method components are implemented as a computer executable code. Such a computer executable code contains a plurality of computer instructions that when performed in a predefined order result with the execution of the tasks disclosed herein. The computer executable code may be uploaded to, and executed by, a machine featuring any suitable architecture. Such computer executable code may be available as source code or in object code, and may be further comprised as part of, for example, a portable memory device or downloaded from the Internet, or embodied on a program storage unit or computer readable medium. Preferably, the machine is implemented on a computer platform having hardware such as one or more central processing units ("CPU"), a random access memory ("RAM"), and input/output interfaces. The computer platform may also include an operating system and microinstruction code. The various processes and functions described herein may be either part of the microinstruction code or part of the application program, or any combination thereof, which may be executed by a CPU or distributed across multiple CPUs or computer platforms, whether or not such computer or processor is explicitly shown. In addition, various other peripheral units may be connected to the computer platform such as an additional data storage unit and a printing unit.

The principles of the present invention may be implemented as a combination of hardware and software and because some of the constituent system components and methods depicted in the accompanying drawings may be implemented in software, the actual connections between the system components or the process function blocks may differ depending upon the manner in which the present invention is programmed.

What we claim is:

1. A method operating in a peer-to-peer (P2P) network for allocating resources to channel swarms in the P2P network, wherein the method is performed by a resource-node in the P2P network, comprising:

occasionally connecting a resource-node to at least one of the channel-swarms;

setting a transience parameter value to a join-start level when the resource-node joins to at least one of the channel-swarms, wherein the join-start level indicates a high likelihood that the resource-node will disconnect from a channel swarm;

periodically setting the transience parameter value of the resource-node according to a predefined transience level;

periodically sending the transience parameter value to consumer-nodes in the P2P network; and periodically disconnecting the resource-node from the at least one of the channel-swarms if the consumed resources by recently connected consumer-nodes are below a predefined threshold; wherein each of the consumer-nodes connects to the resource-node according to the transience parameter value.

2. The method of claim 1, wherein the resources include at least an available upload bandwidth.

3. The method of claim 2, wherein the resource-node is a node in the P2P network with an available upload bandwidth that can be contributed to at least one consumer-node.

4. The method of claim 3, wherein the consumer-node is a node in the P2P network connected to at least one channel swarm, wherein the consumer-node consumes only the required resources.

5. The method of claim 3, further comprising:
broadcasting real-time media content to a plurality of consumer-nodes in a plurality of channel-swarms.

6. The method of claim 1, further comprising:
varying the transience parameter value to different transience levels over time.

7. The method of claim 6, wherein the predefined transience level comprises at least one of: a join-end level, a connect level, a leave-start level, and a leave-end level.

8. The method of claim 7, further comprising:
setting the transience parameter value to the join-end level after a predefined time interval elapsed from the time of setting transience parameter value the join-start level, wherein the join-start level indicates a relatively lesser likelihood that the resource-node will disconnect from a channel swarm than the join-end level.

9. The method of claim 8, further comprising:
setting the transience parameter value to the connect level after a predefined time interval that the resource-node is connected to the channel swarm, wherein the connect level indicates a relatively lesser likelihood that the resource-node will disconnect from a channel swarm than the join-start level, join-end level, leave-start level, and leave-end level.

10. The method of claim 9, further comprising:
setting the transience parameter value to the leave-start-level when the resource-node attempts to leave the channel swarm, wherein the leave-start level indicates a relatively higher likelihood that the resource-node will disconnect from a channel swarm than the connect-level.

11. The method of claim 10, further comprising:
setting the transience parameter value to the leave-end level when the resource-node decides to leave the channel swarm, wherein the leave-end level indicates a relatively higher likelihood that the resource-node will disconnect from a channel swarm than the leave-start level.

12. The method of claim 11, wherein the lower the transience level the less likelihood that the resource-node will disconnect from a channel swarm and the more attractive the resource node is for a consumer node to connect to, wherein the consumer-node consumes resources from at least one resource-node having a relatively lower transience parameter value and sufficient available resources.

13. A computer-readable medium having stored thereon computer executable code executed by in a peer-to-peer (P2P) network for allocating resources to channel swarms in the P2P, the computer executable code when executed by a resource-node in the P2P network comprising:
occasionally connecting the resource-node to at least one of the channel-swarms;
setting a transience parameter value to a join-start level when the resource-node joins to at least one of the channel-swarms, wherein the join-start level indicates a high likelihood that the resource-node will disconnect from a channel swarm;
periodically setting the transience parameter value of the resource-node according to a predefined transience level;
periodically sending the transience parameter value to consumer-nodes in the P2P network; and
periodically disconnecting the resource-node from the to at least one of the channel-swarms if the consumed resources by recently connected consumer-nodes are below a predefined threshold; wherein each of the consumer-nodes connects to the resource-node according to the transience parameter value.

14. The computer executable code of claim 13, wherein the resources include at least an available upload bandwidth.

15. The computer executable code of claim 14, wherein the resource-node is a node in the P2P network with an available upload bandwidth that can be contributed to at least one consumer-node.

16. The computer executable code of claim 15, wherein the consumer-node is a node in the P2P network connected to at least one channel swarm, wherein the consumer-node consumes real-time media content.

17. The computer executable code of claim 15, further comprising:
broadcasting real-time media content to a plurality of consumer-nodes, and a plurality of channel-swarms.

18. The computer executable code of claim 13, further comprising:
varying the transience parameter value to different transience levels over time.

19. The computer executable code of claim 18, wherein the different transience level comprises at least one of: a join-end level, a connect level, a leave-start level, and a leave-end level.

20. The computer executable code of claim 19, further comprising:
setting the transience parameter value to the join-end level after a predefined time interval elapsed from a time of setting transience parameter value the join-start level, wherein the join-start level indicates a relatively lesser likelihood that the resource-node will disconnect from a channel swarm than the join-end level.

21. The computer executable code of claim 20, further comprising:
setting the transience parameter value to the connect level after a predefined time interval that the resource-node is connected to the channel swarm, wherein the connect level indicates a relatively lesser likelihood that the resource-node will disconnect from a channel swarm than the join-start level, join-end level, leave-start level, and leave-end level.

22. The computer executable code of claim 21, further comprising:
setting the transience parameter value to the leave-start-level when the resource-node attempts to leave the channel swarm, wherein the leave-start level indicates a relatively more likelihood that the resource-node will disconnect from a channel swarm than the connect-level.

23. The computer executable code of claim 22, further comprising:
setting the transience parameter value to the leave-end level when the resource-node decides to leave the channel swarm, wherein the leave-end level indicates a relatively more likelihood that the resource-node will disconnect from a channel swarm than the leave-start level.

24. The computer executable code of claim 23, wherein the lower the transience level the less likelihood that the resource-node will disconnect from a channel swarm and the more attractive the resource node is for a consumer node to connect to the resource node and the consumer-node consumes resources from at least one resource-node having a relatively lower transience parameter value and sufficient available resources.

* * * * *